(12) United States Patent
Lee et al.

(10) Patent No.: US 11,499,068 B2
(45) Date of Patent: Nov. 15, 2022

(54) CURABLE PETROLEUM RESIN, PREPARATION METHOD THEREOF, AND USE THEREOF

(71) Applicant: KOLON INDUSTRIES, INC., Seoul (KR)

(72) Inventors: Je Min Lee, Seoul (KR); Myung Jong Kim, Seoul (KR); Wan Jae Lee, Seoul (KR); Dae Soon Park, Seoul (KR); Jun Hyo Park, Seoul (KR)

(*) Notice: Subject to any disclaimer, the term of this patent is extended or adjusted under 35 U.S.C. 154(b) by 337 days.

(21) Appl. No.: 16/626,956

(22) PCT Filed: Jun. 25, 2018

(86) PCT No.: PCT/KR2018/007171
§ 371 (c)(1),
(2) Date: Dec. 27, 2019

(87) PCT Pub. No.: WO2019/004675
PCT Pub. Date: Jan. 3, 2019

(65) Prior Publication Data
US 2020/0140594 A1    May 7, 2020

(30) Foreign Application Priority Data
Jun. 30, 2017 (KR) .................. 10-2017-0083493

(51) Int. Cl.
| *C08F 232/08* | (2006.01) |
| *C09J 123/12* | (2006.01) |
| *C09D 125/10* | (2006.01) |
| *C08F 230/08* | (2006.01) |

(52) U.S. Cl.
CPC ........ *C09D 125/10* (2013.01); *C08F 230/085* (2020.02); *C08F 232/08* (2013.01); *C09J 123/12* (2013.01)

(58) Field of Classification Search
CPC .............................. C08F 232/08; C09J 123/12
See application file for complete search history.

(56) References Cited

U.S. PATENT DOCUMENTS

| 5,824,718 A | 10/1998 | Penfold et al. |
| 8,101,697 B2 | 1/2012 | Pawlow et al. |
| 10,059,782 B2 | 8/2018 | Blok |
| 10,844,251 B2 | 11/2020 | Kouno |
| 2005/0043455 A1 | 2/2005 | Hohner |
| 2009/0302505 A1 | 12/2009 | Kruchten |
| 2013/0178578 A1 | 7/2013 | Ooga |
| 2013/0220516 A1* | 8/2013 | Uhl ............ C08F 8/42 156/60 |
| 2017/0218131 A1* | 8/2017 | Son ............ C08F 4/34 |
| 2018/0264779 A1 | 9/2018 | Endo |

FOREIGN PATENT DOCUMENTS

| EP | 0944670 A1 | 9/1999 |
| JP | 06-056920 A | 3/1994 |
| JP | 07-011220 A | 1/1995 |
| JP | 2012140539 A | 7/2012 |
| JP | 2012140540 A | 7/2012 |
| JP | 2016204663 A | 12/2016 |
| JP | 2017511409 A | 4/2017 |
| KR | 10-0674593 B1 | 1/2007 |
| KR | 10-1174019 B1 | 8/2012 |
| KR | 10-1305438 B1 | 9/2013 |
| KR | 10-2014-0086916 A | 7/2014 |
| KR | 10-2016-0001424 A | 1/2016 |
| KR | 10-2016-0016677 A | 2/2016 |
| WO | 2005/100501 A1 | 10/2005 |
| WO | 16018131 A1 | 2/2016 |
| WO | 17057269 A1 | 4/2017 |

OTHER PUBLICATIONS

European search report dated Apr. 16, 2021.
International Search Report for PCT/KR2018/007171, dated Oct. 2, 2018.
Notice of Reasons for Refusal dated Jan. 26, 2021.
KR NOA dated Dec. 27, 2021.

* cited by examiner

*Primary Examiner* — Robert D Harlan

(74) *Attorney, Agent, or Firm* — Harvest IP Law, LLP

(57) ABSTRACT

The present disclosure relates to: a curable petroleum resin, which includes a repeating unit derived from a petroleum resin monomer, a repeating unit derived from a silane monomer and a repeating unit derived from a styrene-based monomer, and is used as an additive for a reactive polyolefin-based adhesive composition so as to increase adhesiveness to a polyolefin-based substrate used for various components; a preparation method thereof; and a use thereof.

10 Claims, 1 Drawing Sheet

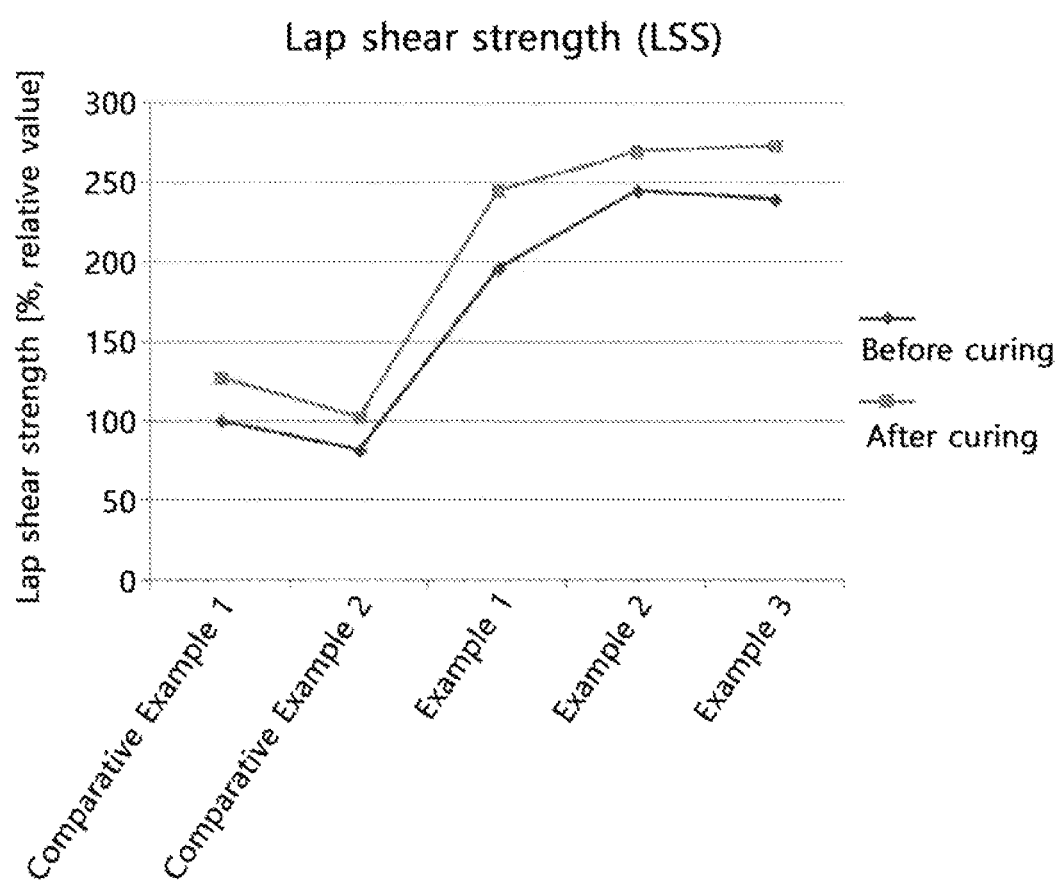

CURABLE PETROLEUM RESIN, PREPARATION METHOD THEREOF, AND USE THEREOF

CROSS REFERENCE TO RELATED APPLICATIONS

This application is a National Stage of International Application No. PCT/KR2018/007171 files Jun. 25, 2018, claiming priority based on Korean Patent Application No. 10-2017-0083493, filed on Jun. 30, 2017, in the Korean Intellectual Property Office, the disclosure of which is incorporated herein by reference in its entirety.

TECHNICAL FIELD

The present disclosure relates to a curable petroleum resin, a preparation method thereof and a use thereof.

BACKGROUND ART

Steel, nonferrous metals such as aluminum and polymer materials such as rubber, plastics, etc. are used in automobiles. For weight reduction of automobiles, steel, nonferrous metals, etc. are replaced by plastics, engineering plastics, rubber, thermoplastic elastomers, etc. Among them, polyolefin-based commodity plastics such as polypropylene are use the most frequently.

Due to the advantages of light weight, low cost and superior chemical resistance and formability, the polyolefin-based commodity plastics are used in large-sized automotive components such as a bumper, an instrument panel, etc. and in interior parts such as a door trim, a dashboard, etc. Among the polyolefin-based resins, polypropylene is regarded as the most promising automotive interior material.

For assembly of plastic materials, various types of adhesives are used, such as a solvent-based adhesive, a water-based adhesive, a hot-melt adhesive, a reactive adhesive, a pressure-sensitive adhesive, etc. Among them, the reactive adhesive receives growing attentions.

The reactive adhesive is cured by heat, light or a curing agent and is advantageous in that the control of curing reaction is easy and it exhibits strong adhesion.

The reactive adhesive is classified into several types depending on base polymers. Among them, a reactive polyurethane-based adhesive (polyurethane reactive adhesive, PUR) having a urethane-based resin as main component is used widely. The reactive polyurethane-based adhesive is advantageous in that, after application onto a substrate, adhesion is achieved through crosslinking (or curing) via reaction with water included in the air and a flexible adhesive film is formed. However, because the isocyanate-based compound used as a main component is expensive and a harmful material such as tin is used as a catalyst, market demands for a sate and environment-friendly adhesive capable of replacing it are increasing.

In response to such demands, a reactive polyolefin-based adhesive (polyolefin reactive adhesive, POR) has been proposed.

The reactive polyolefin-based adhesive is low-priced and has excellent adhesive strength, and uses a low-density/high-density polyethylene resin or a crystalline/non-crystalline polypropylene resin as a main component of a base polymer. It is mixed with a petroleum resin in order to increase adhesive strength with a catalyst for curing reaction.

As the petroleum resin for enhancing adhesive strength, a C5-based petroleum resin or a C9-based petroleum resin is used as a general petroleum resin or a hydrogenated petroleum resin. As one example, Korean Patent Registration No. 10-1174019 presents an aliphatic petroleum resin as a resin providing adhesive property to an adhesive composition containing amorphous polyolefin.

In order to increase curing rate and improve adhesive strength, a method of using a silane-based compound such as a silane coupling agent has been proposed recently. Korean Patent Registration No. 10-1305438 discloses an adhesive including an alkoxysilane compound for adhering polyurethane and an aluminum material used as automotive interior materials.

Such a silane-based compound may be simply added through simple mixing, or may be used as a modified form of a base polymer. Specifically, US Patent Application Publication No. 2005-0043455, European Patent Application No. EP 0 944 670, International Patent Application Publication No. WO 2005/100501, and U.S. Pat. No. 5,824,718 also disclose compositions to which various silane-based compounds are introduced. However, with such methods of simply introducing the silane-based compound, it was impossible to secure effects of enhancing curing rate and improving adhesive strength to desired levels due to a low grafting rate of the silane-based compound.

Meanwhile, U.S. Pat. No. 8,101,697 discloses a polymer composition containing an $\alpha$-olefin including a silane functional group and a polymerizable olefin such as dicyclopentadiene or norbornene dicarboxylic anhydride that can be used. However, the patent is not sufficient to improve adhesive property since the polymerizable olefin is introduced as a substituent, a functional group, etc. through a ring opening metathesis polymerization reaction leading to a branched structure.

In addition, the applicant of the present application has proposed a curable petroleum resin in which a silane-based compound is introduced to a petroleum resin instead of a base polymer in Korean Patent Publication No. 2016-0016677. There, only the possibility of curing was evaluated together with the description that the proposed petroleum resin may be used as a reactive adhesive because it has a double bond in the molecular structure and is curable. That is to say, it was confirmed that a certain level of adhesive strength can be secured by using a silane-based compound-introduced petroleum resin as an adhesive for a polyolefin-based substrate. However, a higher level of adhesive strength is required in the related art.

Meanwhile, a polyolefin-based substrate used as an automotive interior material generally undergoes pretreatment such as corona treatment, plasma treatment, primer treatment, etc. prior to adhesive treatment in order to increase adhesive strength.

The polyolefin-based substrate is typically nonpolar, and is generally made to be temporarily polar through pretreatment such as corona treatment in order to increase adhesive strength. However, such a pretreatment process is problematic in that it makes the entire process complicated and raises the overall cost.

Due to the pretreatment, the automotive manufacturing process becomes lengthy and costly.

In addition, because the most common cause of defects in the adhesion area is improper adherend preparation and inappropriate adhesive selection rather than adhesive strength, securing an adhesive suitable for polyolefin-based materials used as automotive interior materials is pressing.

In particular, because the ABS substrate, which is one of the substrates frequently used as automotive materials, has an aromatic structure, an adhesive suitable for substrates including aromatic structures is also necessary.

REFERENCES OF RELATED ART

Patent Documents (Patent document 1) Korean Patent Registration No. 10-1305438 (Sep. 20, 2013), Adhesive for adhering polyurethane and aluminum.

(Patent document 2) US Patent Application Publication No. 2005-0043455 (Feb. 24, 2005), Modified polyolefin waxes.

(Patent document 3) European Patent Application Publication No. EP 0 944 670 (Nov. 22, 2000), Abrasion-resistant, silane-crosslinkable polymer and polymer blend compositions.

(Patent document 4) International Patent Application Publication No. WO 2005/100501 (Oct. 27, 2005), Polyolefin adhesive compositions and articles made therefrom.

(Patent document 5) U.S. Pat. No. 5,824,718 (Oct. 20, 1998), Silane-crosslinkable, substantially linear ethylene polymers and their uses.

(Patent document 6) U.S. Pat. No. 8,101,697 (Jan. 24, 2012), Multi-functionalized high-trans elastomeric polymers.

(Patent document 7) Korean Patent Publication No. 2016-0016677 (Feb. 15, 2016), Curable petroleum resin and preparation method thereof.

DISCLOSURE

Technical Problem

In order to solve the problems discussed above, the inventors of the present disclosure have aimed at preparing a reactive polyolefin-based adhesive composition capable of increasing adhesive strength to a polyolefin-based substrate without a pretreatment process such as corona treatment, etc. As a result, the inventors of the present disclosure have identified that, when a copolymer including a repeating unit derived from a petroleum resin monomer, a repeating unit derived from a silane monomer and a repeating unit derived from a styrene-based monomer is used as a petroleum resin for a reactive polyolefin-based adhesive composition, superior adhesive strength to a polyolefin-based substrate can be secured after a curing process.

In addition, in consideration of the fact that the ABS substrate, which is one of the substrates frequently used as automotive materials, has an aromatic structure, they have introduced an aromatic structure into the adhesive resin and have developed a novel curable petroleum resin to which the repeating unit derived from a styrene-based monomer has been introduced in order to improve wettability between the substrate and the adhesive and to increase adhesive strength thereby. They have identified that remarkably improved adhesive property can be achieved when compared with the existing adhesives.

The present disclosure is directed to providing a curable petroleum resin including a repeating unit derived from a styrene-based monomer.

The present disclosure is also directed to providing a method for preparing the curable petroleum resin.

The present disclosure is also directed to providing a reactive polyolefin-based adhesive composition containing the curable petroleum resin.

Technical Solution

The present disclosure provides a curable petroleum resin including a repeating unit derived from a petroleum resin monomer, a repeating unit derived from a silane monomer and a repeating unit derived from a styrene-based monomer.

Herein, the styrene-based monomer is one or more selected from a group consisting of styrene, α-methylstyrene, 3-methylstyrene, 4-methylstyrene, 2,4-dimethylstyrene, 2,5-dimethylstyrene, 2-methyl-4-chlorostyrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, 4-hydroxystyrene and a mixture thereof.

The petroleum resin monomer includes one selected from a group consisting of a mixed C5 fraction, a mixed C9 fraction, dicyclopentadiene and a mixture thereof obtained from naphtha cracking.

In addition, the copolymerized silane monomer includes one selected from a group consisting of vinyltrimethylsilane, vinyltrimethoxysilane, vinyltriethoxysilane, triacetoxyvinylsilane, triphenylvinylsilane, tris(2-methoxyethoxy)vinylsilane, 3-(trimethoxysilyl)propyl methacrylate, γ-(meth)acryloxypropyltrimethoxysilane and a mixture thereof.

The present disclosure also provides a method for preparing a curable petroleum resin of copolymerizing a repeating unit derived from a petroleum resin monomer, a repeating unit derived from a silane monomer and a repeating unit derived from a styrene-based monomer.

The present disclosure also provides a use of the curable petroleum resin as an adhesive composition.

Advantageous Effects

A curable petroleum resin according to the present disclosure can be cured by a double bond present in the molecular structure and, thus, can be preferably used as a reactive adhesive, especially as a reactive polyolefin-based adhesive.

Such a reactive polyolefin-based adhesive can ensure high adhesive strength and adhesion for a polyolefin-based substrate including an aromatic structure in the substrate, such as ABS, etc., due to the aromatic structure present in the curable petroleum resin.

Particularly, superior adhesive strength and adhesion can be ensured for a polyolefin substrate which has not undergone a pretreatment process for enhancing adhesive strength, such as corona, plasma, etc. Therefore, production cost of various products using polyolefin as a substrate may be reduced significantly, and the process may be simplified further.

The reactive polyolefin-based adhesive can be applied in various fields such as packaging, bookbinding, paper processing, construction and civil engineering, textile and leather processing, electric and electronic products, automobiles, etc.

BRIEF DESCRIPTION OF DRAWINGS

FIG. 1 shows the change in lap shear strength of the compositions of Examples 1-3 and Comparative Examples 1 and 2 before and after curing, measured in Test Example 2.

BEST MODE

Hereinafter, the present disclosure is described in more detail.

A polyolefin-based substrate is typically nonpolar, and is generally made to be temporarily polar through pretreatment such as corona treatment in order to increase adhesive strength. However, the present disclosure provides an adhesive that can be used in the nonpolar polyolefin-based substrate as it is without such expensive pretreatment.

Adhesion refers to a state in which two surfaces are attached by the attraction of molecules atoms or ions. For an adhesive, which is a material capable of attaching two materials by interfacial attraction, wetting and adhesive strength are required. As the wetting for a substrate is more advantageous, the initial adhesion area is relatively wider and the adhesive strength is higher. Therefore, in the present disclosure, a reactive adhesive composition employing a polyolefin-based base polymer having a chemical structure similar to the polyolefin-based substrate is used.

In a reactive polyolefin-based adhesive composition, a petroleum resin is mixed with a polyolefin-based base polymer in order to increase adhesive strength to a catalyst for a curing reaction. The present disclosure provides a petroleum resin having a new composition as the petroleum resin so that curing can be achieved while having excellent adhesive strength to a polyolefin-based substrate.

Petroleum Resin

Specifically, the petroleum resin according to the present disclosure is in the form of a copolymer wherein three types of monomers are copolymerized as represented in the following Chemical Formula 1.

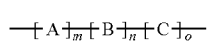
[Chemical Formula 1]

In Chemical Formula 1,

A is a repeating unit derived from a petroleum resin monomer,

B is a repeating unit derived from a silane monomer,

C is a repeating unit derived from a styrene-based monomer, and each of m, n and o is an integer 1 or greater.

Although the form of the copolymer is expressed as above for convenience, it is not particularly limited in the present disclosure, and various forms such as a random copolymer, an alternative copolymer, a block copolymer, a graft copolymer and a star block copolymer may be included. Specifically, it may be a random copolymer.

Hereinafter, each repeating unit is described in detail.

A first repeating unit forming the curable petroleum resin according to the present disclosure is a repeating unit derived from a petroleum resin monomer (A) obtained from naphtha cracking, and includes one or more an ethylenically unsaturated functional group, which is a polymerizable functional group, in the molecular structure.

The petroleum resin monomer may be commercially available liquid mixed C5-C12 fractions or a diolefin. Specifically, it may be a mixed C5 fraction, a mixed C9 fraction or a diolefin.

The mixed C5 fraction may include 1-pentene, 2-methyl-2-butene, n-pentane, propadiene, dicyclopentadiene, piperylene, isoprene, cyclopentene, 1,3-pentadiene, etc., the mixed C9 fraction may include styrene, vinyltoluene, indene, α-methylstyrene, benzene/toluene/xylene (BTX), etc., and the diolefin may include propadiene, dicyclopentadiene, piperylene, isoprene, cyclopentene, 1,3-pentadiene, etc. Specifically, a diolefin, and more specifically, dicyclopentadiene may be included as the petroleum resin monomer.

A second repeating unit forming the curable petroleum resin according to the present disclosure together with the repeating unit (A) is a repeating unit derived from a silane monomer (B). It provides a reaction site for crosslinking and curing. The petroleum resin may be cured through the crosslinking and the curing, and when added to a reactive adhesive, adhesive strength may be further enhanced by the curing rather than simply enhancing gluing strength.

The repeating unit (B) is derived from a silane monomer, and is specifically a compound including an ethylenically unsaturated functional group, a polymerizable function group in the molecular structure, represented by the following Chemical Formula 2:

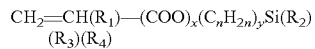
[Chemical Formula 2]

In Chemical Formula 2, $R_1$ is hydrogen or a methyl group, each of $R_2$ through $R_4$, which are identical to or different from each other, is hydrogen, a $C_1$-$C_{20}$ alkyl group, a $C_3$-$C_{12}$ cycloalkyl group, a $C_1$-$C_{12}$ alkoxy group, a $C_2$-$C_{12}$ acyloxy group, a $C_6$-$C_{30}$ aryloxy group, a $C_5$-$C_{30}$ araloxy group or a $C_1$-$C_{20}$ amine group, n is an integer from 1 to 12, and each of x and y is 0 or 1.

Specifically, $R_1$ is hydrogen or a methyl group, each of $R_2$ through $R_4$, which are identical to or different from each other, is s $C_1$-$C_6$ alkyl group or a $C_1$-$C_6$ alkoxy group, n is an integer from 1 to 6, and each of x and y is 0 or 1.

The "alkyl" mentioned in the present specification means a linear or branched saturated monovalent hydrocarbon moiety with 1 to 20, specifically 1 to 10, more specifically 1 to 6, carbon atoms. The alkyl group may be unsubstituted or may be further substituted by certain substituents to be described later. Examples of the alkyl group may include methyl, ethyl, propyl, 2-propyl, n-butyl, isobutyl, tert-butyl, pentyl, hexyl, dodecyl, etc., and when further substituted with a halogen, may include fluoromethyl, difluoromethyl, trifluoromethyl, chloromethyl, dichloromethyl, trichloromethyl, iodomethyl, bromomethyl, etc.

The "cycloalkyl" mentioned in the present specification means a saturated or unsaturated non-aromatic monovalent monocyclic, bicyclic or tricyclic hydrocarbon moiety with 3 to 12 cyclic carbons. It may be further substituted by certain substituents to be described later.

Examples may include cyclopropyl, cyclobutyl, cyclopentyl, cyclopentenyl, cyclohexyl, cyclohexenyl, cycloheptyl, cyclooctyl, decahydronaphthalenyl, adamantyl, norbornyl (i.e., bicyclo[2,2,1]hept-5-enyl), etc.

The "alkoxy" mentioned in the present specification means a linear or branched saturated monovalent hydrocarbon moiety with 1 to 12, specifically 1 to 10, more specifically 1 to 6, carbon atoms. The alkoxy group may be unsubstituted or may be further substituted by certain substituents to be described later. Examples of the alkoxy group may include methoxy, ethoxy, propoxy, isopropoxy, butoxy, pentoxy, heptoxy, dodexy, etc., and when further substituted with a halogen, may include fluoromethoxy, difluoromethoxy, trifluoromethoxy, chloromethoxy, dichloromethoxy, trichloromethoxy, iodomethoxy, bromomethoxy, etc.

The "acyloxy" mentioned in the present specification is a linear or branched hydrocarbon with 1 to 12, specifically 1 to 10, carbon atoms, and examples thereof may include acetoxy, ethanoloxy, propanoloxy, butanoloxy, pentanoloxy, hexanoloxy, 2,2-dimethylpropanoloxy, 3,3-dimethylbutanoloxy, etc. These may be further substituted with certain substituents to be described later.

The "aryloxy" mentioned in the present specification includes oxygen included in a monocyclic aryl group or a polycyclic aryl group. Herein, the aryl group means an aromatic ring. Specific examples of the aryloxy group may include phenoxy, p-tolyloxy, m-tolyloxy, 3,5-dimethyl-phenoxy, 2,4,6-trimethylphenoxy, p-tert-butylphenoxy, 3-biphenyloxy, 4-biphenyloxy, 1-naphthyloxy, 2-naphthyloxy, 4-methyl-1-naphthyloxy, 5-methyl-2-naphthyloxy, 1-anthryloxy, 2anthryloxy, 9-anthryloxy, 1-phenanthryloxy, 3-phenanthryloxy, 9-phenanthryloxy, etc., but are not limited thereto.

The number of carbon atoms in the "amine group" mentioned in the present specification is not particularly limited, but is specifically from 1 to 30. Specific examples of the amine group may include a methylamine group, a dimethylamine group, an ethylamine group, a diethylamine group, a phenylamine group, a naphthylamine group, a biphenylamine group, an anthracenylamine group, a 9-methyl-anthracenylamine group, a diphenylamine group, a phenylnaphthylamine group, a ditolylamine group, a phenyltolylamine group, a triphenylamine group, etc., but are not limited thereto.

In the present specification, all compounds or substituents may be substituted or unsubstituted unless particularly mentioned. Herein, the substituted means hydrogen being replaced by any one selected from a group consisting of a halogen atom, a hydroxyl group, a carboxyl group, a cyano group, a nitro group, an amino group, a thio group, a methylthio group, an alkoxy group, a nitrile group, an aldehyde group, an epoxy group, an ether group, an ester group, a carbonyl group, an acetal group, a ketone group, an alkyl group, a perfluoroalkyl group, a cycloalkyl group, a heterocycloalkyl group, an allyl group, a benzyl group, an aryl group, a heteroaryl group, a derivative thereof and a combination thereof.

Specifically, the silane monomer of Chemical Formula 2 may include one selected from a group consisting of vinyltrimethylsilane, vinyltrimethoxysilane, vinyltriethoxysilane, triacetoxyvinylsilane, triphenylvinylsilane, tris(2-methoxyethoxy)vinylsilane, 3-(trimethoxysilyl)propyl methacrylate, γ-(meth)acryloxypropyltrimethoxysilane and a mixture thereof, and preferably may include vinyltrimethoxysilane.

When only the silane compound is copolymerized with the petroleum resin monomer, adhesivity to a polyolefin-based substrate is low. Therefore, the styrene-based monomer is used for the copolymerization in the present disclosure in order to increase compatibility with the polyolefin-based substrate.

Accordingly, a repeating unit (C), which is a third repeating unit forming the petroleum resin according to the present disclosure, is a repeating unit derived from a styrene-based monomer, and contributes to increasing adhesive strength to the polyolefin substrate. The styrene monomer proposed in the present disclosure has a polymerizable double bond together with an aromatic structure in the molecular structure. The double bond contributes to the copolymerization of the petroleum resin monomer and the silane monomer, and the aromatic structure contributes to the enhancement of adhesive strength.

Specifically, the styrene-based monomer has one double bond in the molecular structure, and addition polymerization occurs between neighboring molecules as the double bond is broken during the copolymerization of the petroleum resin monomer with the silane monomer. Therefore, the presence of the aromatic structure with superior adhesive strength in the petroleum resin can ensure high adhesive strength to the polyolefin-based substrate.

As the styrene-based monomer, one or more selected from a group consisting of styrene, α-methylstyrene, 3-methylstyrene, 4-methylstyrene, 2,4-dimethylstyrene, 2,5-dimethylstyrene, 2-methyl-4-chlorostyrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, 4-hydroxystyrene and a mixture thereof may be used. Specifically, styrene is used.

The curable petroleum resin according to the present disclosure having the repeating units described above is required to limit the content of each of the repeating units in order to provide proper gluing strength for a reactive adhesive composition, and to allow curing and enhance adhesive strength. The contents of the monomers are ranges to maximize the effect of introducing the silane monomer and the styrene-based monomer, i.e., enhancing curing ability and adhesive strength, while maintaining basic physical properties of the petroleum resin itself. If the content of the silane-based monomer or the styrene-based monomer increases, the softening point and degree of polymerization of the petroleum resin become different, and the above-described effects may be secured sufficiently.

Specifically, the repeating unit (A) is included in an amount of 30-70%, preferably 40-60 wt %, the repeating unit (B) is included in an amount of 10-40 wt %, preferably 15-35 wt %, and the repeating unit (C) is included in an amount of 10-40 wt %, preferably 15-35 wt %, based on 100 wt % of the total repeating units. If the content of the repeating unit (A) is less than the above-mentioned range, a desired level of adhesive strength may not be achieved. And, if the content is greater than the above-mentioned range, the content of the other repeating units is relatively insufficient and, thus, it is difficult to expect enhancement of curing ability and adhesive strength. In addition, if the content of the repeating unit (B) is less than the above-mentioned range, curing ability declines, causing the problem of increased curing time. And, if the content is greater than the above-mentioned range, excessive curing occurs or it becomes difficult to control curing time. Moreover, if the content of the repeating unit (C) is less than the above-mentioned range, enhancement in the adhesive strength to the polyolefin-based substrate may not be expected. And, if the content is greater than the above-mentioned range, the content of the other repeating units is relatively insufficient and, thus, it is difficult to expect enhancement in curing ability and adhesive strength.

The petroleum resin prepared according to the present disclosure has a softening point of 70-150° C. and a weight-average molecular weight ($M_w$) of 500-5,000 g/mol.

Method for Preparing Petroleum Resin

Meanwhile, the curable petroleum resin according to the present disclosure is prepared by copolymerizing the petroleum resin monomer, the silane monomer and the styrene-based monomer described above. Herein, the copolymerization is progressed by an addition reaction between double bonds present in the respective monomers. Particularly, in the petroleum resin according to the present disclosure, the silane participating in copolymerization provides a factor for the moisture curing mechanism, and the styrene additionally participating in the copolymerization enhances wettability and compatibility of the substrate including aromatic components because it also includes aromatic components. Therefore, improved adhesive property to the substrate may be achieved when the curable petroleum resin is included in a reactive adhesive composition.

Various methods may be used for the copolymerization, and the present disclosure is not particularly limited to specific methods. For example, thermal polymerization, photopolymerization, ion polymerization or radiation polymerization may be used. Specifically, thermal polymerization may be used.

The thermal polymerization may be performed by introducing the petroleum resin monomer, the silane monomer and the styrene-based monomer into a reactor, and then reacting the mixture for 0.5-10 hours, specifically for 1-3 hours, by heating to 150-300° C. If necessary, pressure may be applied. The pressure may be applied by providing a separate pressure-applying device or by performing the thermal polymerization in an autoclave. Herein, the pressure may be in a range of 20-25 bar.

These ranges of reaction temperature, time and pressure during the thermal polymerization are optimal parameters for obtaining a petroleum resin capable of satisfying the copolymer properties (molar ratio, composition) provided above. If the ranges of reaction temperature, time and pressure are outside the above-mentioned ranges, such problems as unreacted materials remaining in the final product or decreased molecular weight of the petroleum resin may occur. In addition, if the thermal polymerization is performed under an excessive condition, such problems as decreased adhesive strength due to side reactions, excessive increase in molecular weight, etc. occur.

Particularly, when preparing the petroleum resin of the present disclosure, it is not necessary to use a thermal polymerization initiator during the thermal polymerization due to the high reactivity of each of the monomers. And, if necessary, a reaction solvent may be used.

As the reaction solvent, a non-polymerizable solvent may be used. For example, propane, butane, pentane, hexane, octane, decane, dodecane, cyclopentane, methylcyclopentane, cyclohexane, methylcyclohexane, benzene, toluene, xylene, dichloromethane, chloroethane, dichloroethane, chlorobenzene, etc. may be used. Specifically, benzene, xylene, toluene, cyclohexane or a mixed solvent thereof may be used. The reaction solvent may be diluted so that the final concentration of the reactant becomes 30-70 wt %.

The petroleum resin obtained after the thermal polymerization may undergo a common post-treatment process such as degassing and concentration processes to remove unreacted materials, side reaction products, etc. As a result, the curable petroleum resin to be prepared in the present disclosure is obtained.

The degassing process is a process for separating the solid curable petroleum resin from unreacted materials and side reaction products (e.g., oligomers), and may be performed at high temperature, and if necessary, may be performed under high pressure.

The degassing process is directly related to the yield and softening point of the petroleum resin. As the degassing temperature increases, the yield and the softening point tend to decrease. However, if the degassing temperature is too low, the purity of the curable petroleum resin decreases greatly because it is difficult to remove unreacted materials and side reaction products. Accordingly, the degassing process needs to be performed under the condition where the yield and the softening point are not decreased.

Specifically, in the present disclosure, the degassing process is performed at 200-280° C., preferably at 230-270° C., for 1-15 minutes. If the degassing is performed at a temperature lower than the above-mentioned range, the purity of the curable petroleum resin decreases as described above. And, if it is performed at a temperature higher than the above-mentioned range, the yield and the softening point decrease, resulting in decline in the physical properties (i.e., adhesive strength, cohesive strength) of the finally obtained petroleum resin. Therefore, the above-mentioned temperature range is preferred.

Reactive Adhesive Composition

The curable petroleum resin described above may be used in various applications, and may be specifically used in a reactive adhesive composition since curing is achieved by a double bond in the molecular structure.

The reactive adhesive composition may contain a polyolefin-based base polymer, a petroleum resin and a catalyst, and particularly, high adhesive strength to various substrates may be secured by using the above-described curable petroleum resin as a petroleum resin of the reactive polyolefin-based adhesive composition in the present disclosure.

In particular, due to high adhesive strength, the reactive polyolefin-based adhesive composition of the present disclosure may avoid the pretreatment process (e.g., plasma treatment, corona treatment, primer treatment, etc.) of a substrate, which has been performed for securing adhesive strength in the prior art. The substrate is not particularly limited in the present disclosure, and various plastics, films, paper, non-woven fabrics, glass or metals may be used. Among the plastics, polyolefin-based resins used as automotive interior materials may be used.

Specifically, the reactive polyolefin-based adhesive composition according to the present disclosure contains 70-94 wt %, preferably 75-90 wt %, of the polyolefin-based base polymer, 5-30 wt %, preferably 10-25 wt %, of the curable petroleum resin, and 0.1-10 wt %, preferably 0.5-5 wt % of the catalyst, based on 100 wt % of the total composition.

If the content of the curable petroleum resin is less than the above-mentioned range, the effect of enhancing adhesion performance may not be expected. And if the content is greater than the above-mentioned range on the contrary, the content of the other compositions decreases relatively, and the functions as the reactive adhesive composition may not be satisfactory. The content of the polyolefin-based base polymer and the content of the catalyst are limited so that the function of each composition is achieved sufficiently.

The polyolefin-based base polymer constituting the reactive polyolefin-based adhesive composition is not particularly limited in the present disclosure, and polymers commonly used in the art may be used.

As one example, the polyolefin-based base polymer may be poly-α-olefin, a polyolefin homopolymer, a copolymer thereof or a blend thereof. The poly-α-olefin may be obtained by copolymerizing a linear alpha-olefin such as 1-butene, 1-pentene, 1-hexene, 1-heptene, 1-octene, 1-decene, 1-undecene, 1-dodecene, 1-tetradecene, 1-hexadecene, 1-eicosene, etc., and the polyolefin may be polyethylene, a polypropylene homopolymer, or a copolymer thereof. If necessary, the poly-α-olefin and the polyolefin may be used as they are, or may be silane-modified.

The polyolefin-based base polymer may be prepared directly, or a commercially-available product may be purchased. For example, as a silane-modified poly-α-olefin, VESTOPLAST (e.g., VESTOPLAST 206V, VESTOPLAST 2412), etc. of Evonik Degussa GmbH may be used. As a silane-modified polyolefin, Licocene PE SI 3361 TP, Licocene PP, etc. of Clariant AG may be used. As an ethylene α-olefin, Vistamaxx 6102 (propylene-based elastomer), EXACT 5008 (ethylene-butene copolymer), EXACT 3031 (ethylene-hexene copolymer), etc. of ExxonMobil Chemical Co. may be used. In addition, ENGAGE (e.g., ENGAGE 8200), etc. of Dow Chemical Co. may be used.

The curing catalyst may be added to adjust curing rate. As specific examples, a phosphine-based catalyst, a boron-based catalyst, an imidazole-based catalyst or a mixed catalyst thereof may be used.

As the phosphine-based curing catalyst, triphenylphosphine, tri-o-tolylphosphine, tri-m-tolylphosphine, tri-ptolylphosphine, tri-2,4-xylylphosphine, tri-2,5-xylylphosphine, tri-3,5-xylylphosphine, tribenzylphosphine, tris(p-methoxyphenyl)phosphine, tris(p-tert-butoxyphenyl)phosphine, diphenylcyclohexylphosphine, tricyclohexylphosphine, tributylphosphine, tri-tert-butylphosphine, tri-noctylphosphine, diphenylphosphinostyrene, diphenylphosphinous chloride, trinoctylphosphine oxide, diphenylphosphinyl hydroquinone, tetrabutylphosphonium hydroxide, tetrabutylphosphonium acetate, benzyltriphenylphosphonium hexafluoroantimonate, tetraphenylphosphonium tetraphenylborate, tetraphenylphosphonium tetra-p-tolylborate, benzyltriphenylphosphonium tetraphenylborate, tetraphenylphosphonium tetrafluoroborate, p-tolyltriphenylphosphonium tetra-p-tolylborate, triphenylphosphine triphenylborane, 1,2-bis(diphenylphosphino)ethane, 1,3-bis(diphenylphosphino)propane, 1,4-bis(diphenylphosphino)butane, 1,5-bis(diphenylphosphino)pentane and the like may be used, although not being necessarily limited thereto. These may be used either alone or as a mixture of two or more.

As the boron-based curing catalyst, phenylboronic acid, 4-methylphenylboronic acid, 4-methoxyphenylboronic acid, 4-trifluoromethoxyphenylboronic acid, 4-tert-butoxyphenylboronic acid, 3-fluoro-4-methoxyphenylboronic acid, pyridine-triphenylborane, 2-ethyl-4-methylimidazolium tetraphenylborate, 1,8-diazabicyclo[5.4.0]undecene-7-tetraphenylborate, etc. may be used, however, although not being necessarily limited thereto. These may be used either alone or as a mixture of two or more.

In addition, the reactive polyolefin-based adhesive composition according to the present disclosure may suitably contain at least one additive selected from a group consisting of a silane coupling agent, a filler, a flame retardant, a pigment, an antioxidant, an ultraviolet stabilizer, a dispersant, a defoamer, a thickening agent, a plasticizer, a gluing property-providing resin and a combination thereof.

As one example, epoxy-containing silane or mercapto-containing silane may be used as the silane coupling agent. Examples of the epoxy-containing silane coupling agent may include 2-(3,4-epoxycyclohexyl)-ethyltrimethoxysilane, 3-glycidoxytrimethoxysilane, 3-glycidoxypropyltriethoxysilane and 3-glycidoxypropyltriethoxysilane, examples of the amine group-containing may include N-2-aminoethyl-3-aminopropylmethyldimethoxysilane, N-2-aminoethyl-3-aminopropyltrimethoxysilane, N-2-aminoethyl-3-aminopropyltriethoxysilane, 3-aminopropyltrimethoxysilane, 3-aminopropyltriethoxysilane, 3-triethoxysilyl-N-(1,3-dimethylbutylidene)propylamine, N-phenyl-3-aminopropyltrimethoxysilane etc., although not being necessarily limited thereto. These may be used either alone or as a mixture of two or more.

As the mercapto-containing silane, 3-mercaptopropylmethyldimethoxysilane, 3-mercaptopropyltriethoxysilane, isocyanate-containing 3-isocyanatepropyltriethoxysilane, etc. may be used, although not being necessarily limited thereto. These may be used either alone or as a mixture of two or more.

As the filler, an inorganic or organic filler may be used as necessary.

As the inorganic filler, a metal component such as gold powder, silver powder, copper powder or nickel, or a non-ferrous metal component such as alumina, aluminum hydroxide, magnesium hydroxide, calcium carbonate, magnesium carbonate, calcium silicate, magnesium silicate, calcium oxide, magnesium oxide, aluminum oxide, aluminum nitride, silica, boron nitride, titanium dioxide, glass, iron oxide, ceramic, etc. may be used, although not being necessarily limited thereto. These may be used either alone or as a mixture of two or more.

As the organic filler, carbon, a rubber-based filler, a polymer-based filler, etc. may be used, although not being necessarily limited thereto. These may be used either alone or as a mixture of two or more.

The particle size of the filler may be from about 10 nm to about 10 μm, specifically from about 100 nm to about 7 μm.

The reactive polyolefin-based adhesive composition having the composition described above may be prepared by mixing the respective components using, for example, a mixer such as a plastomill, a Banbury mixer, a roller or an internal mixer.

The reactive polyolefin-based adhesive composition presented in the present disclosure can be cured by thermal curing. When room temperature or thermal curing is performed, the curing may be performed at about 20-100° C. for from 30 seconds to 72 hours depending on the condition.

Particularly, the reactive polyolefin-based adhesive composition may be used in any field requiring adhesion ability without limitation in materials and forms. As one example, the reactive polyolefin-based adhesive composition may be used in various materials such as nonferrous metals, rubber, plastics, fibers, wood, leather, ceramics, paper, glass, etc., specifically in plastics, especially in polyolefin-based materials, specifically polyethylene or polypropylenes.

More specifically, the reactive polyolefin-based adhesive composition of the present disclosure may be used in automotive interior materials using polyolefin-based materials such as polyethylene, polypropylene, etc., especially in automotive interior materials including aromatic structures such as ABS.

MODE FOR CARRYING OUT DISCLOSURE

Hereinafter, the present disclosure will be described in detail through examples. However, the following examples are for illustrative purposes only and it will be apparent to those of ordinary skill in the art that the scope of the present disclosure is not limited by the examples.

Preparation Example 1: Preparation of Petroleum Resin A

To 567.70 g of dicyclopentadiene (DCPD, Kolon Industries, Inc., purity 76.10%), 144.00 g of vinyltrimethoxysilane (TMVS, Aldrich, purity 99.99%) and 144.00 g of styrene (SM, Aldrich, purity 99.99%), 344.30 g of Hysol (Kolon Industries, Inc., a process product with a non-polymerizable naphthene-based material as main component, used as a solvent) was introduced in an 1-L autoclave as a solvent, after weighing such that the total amount of the three components was 60% with respect to the capacity of the autoclave. After introducing the raw materials, the reactor was purged with nitrogen and slightly pressurized in order to avoid unnecessary reactions such as reaction with oxygen at high temperature.

The reactor temperature was raised up to 278° C., and reaction was progressed for 3 hours after the reaction temperature was reached. The pressure inside the reactor was adjusted to 1.5 bar while purging with nitrogen, and stirring was performed at 300 rpm. When the reaction was completed, the product was cooled after setting the temperature to room temperature. When the cooling was completed to 30° C. or lower, the pressure of the reactor was released, and the reactor was opened to obtain a polymer.

Unreacted materials and the solvent included in the polymer other than the polymerization product were removed. Specifically, the total amount of the polymer was introduced to a 1-L glass 4-neck kettle. After vacuumizing at room temperature to 1 bar or lower, the temperature was raised up to 245° C. while stirring. When reaching 245° C., concentration was conducted for 10 minutes. When the concentration was completed, the vacuum was released in that state, and the melted resin content inside was recovered.

Preparation Example 2: Preparation of Petroleum Resin B

A petroleum resin B was prepared in the same manner as in Preparation Example 1 with the content of the monomers described in Table 1.

Preparation Example 3: Preparation of Petroleum Resin C

A petroleum resin C was prepared in the same manner as in Preparation Example 1 with the content of the monomers described in Table 1.

Preparation Example 4: Preparation of Petroleum Resin D

A petroleum resin D was prepared in the same manner as in Preparation Example 1 except that DCPD was used as a single petroleum resin monomer.

TABLE 1

|  |  |  | Prep. Ex. 1 | Prep. Ex. 2 | Prep. Ex. 3 | Prep. Ex. 4 |
|---|---|---|---|---|---|---|
| Monomer | Input amount (g) | C5-DCPD | 567.70 | 473.20 | 378.50 | 789.03 |
|  |  | TMVS | 144.00 | 144.00 | 144.00 | 0 |
|  |  | SM | 144.00 | 216.00 | 288.00 | 0 |
|  |  | Solvent | 344.30 | 366.80 | 389.50 | 410.86 |
|  | Monomer concentration (%) |  | 60.00% | 60.00% | 60.00% | 60.00% |
|  | Input amount (wt %) | C5-DCPD | 60.00% | 50.00% | 40.00% | 100.00% |
|  |  | TMVS | 20.00% | 20.00% | 20.00% | 0% |
|  |  | SM | 20.00% | 30.00% | 40.00% | 0% |
| Copolymer |  |  | [DCPD]-[TMVS]-[SM] | [DCPD]-[TMVS]-[SM] | [DCPD]-[TMVS]-[SM] | [DCPD] |

Test Example 1: Analysis of Physical Properties of Curable Petroleum Resin

The physical properties of the petroleum resins prepared in Preparation Example 1-4 were measured and the result is given in Table 2. The physical properties were evaluated as follows.

(1) Yield (%): Percentage of the weight of the resin remaining after the concentration with respect to the weight of the product obtained from the polymerization.

(2) Softening point (° C.): Measured according to ASTM E 28. The sample was melted and poured into a round ring. When the resin was hardened, it was mounted on a softening point measuring device. After placing an iron ball on the hardened resin, the temperature was raised at a rate of 0.5° C./min, and the temperature at which the iron ball fell as the resin was melted was measured.

(3) Molecular weight (g/mol): The polystyrene-converted weight-average molecular weight ($M_w$), number-average molecular weight ($M_n$) and Z-average molecular weight ($M_z$) were measured by gel permeation chromatography (Hewlett-Packard, model HP-1100). The measured polymer was dissolved in tetrahydrofuran to a concentration of 4000 ppm, and 100 μL was subjected to GPC. Tetrahydrofuran was used as a mobile phase of the GPC. It introduced at a flow rate of 1.0 mL/min, and analysis was performed at 30° C. Three Plgel columns (1,000 Å+500 Å+100 Å, Agilent Technologies, Inc.) were connected in series. An RI detector (Hewlett-Packard, HP-1047 Å) was used as a detector, and measurement was made at 30° C. The polydispersity index (PDI) was calculated by dividing the measured weight-average molecular weight by the number-average molecular weight.

TABLE 2

|  | Yield (%) | Softening point (° C.) | NMR (%) | | Molecular weight (g/mol) | | | |
|---|---|---|---|---|---|---|---|---|
|  |  |  | Aromatic | Silane | Mn | Mw | Mz | MWD |
| Prep. Ex. 1 | 72 | 110.0 | 10 | 10.9 | 750 | 1590 | 3820 | 2.13 |
| Prep. Ex. 2 | 65 | 100.0 | 15 | 9.7 | 680 | 1320 | 3660 | 1.95 |
| Prep. Ex. 3 | 66 | 90.0 | 20 | 8.7 | 700 | 1670 | 6920 | 2.40 |
| Prep. Ex. 4 | 40 | 90 | 0 | 0 | 368 | 570 | 832 | 1.55 |

Examples 1-3 and Comparative Examples 1-2:
Preparation of Reactive Adhesive Composition A reactive adhesive composition was prepared using each of the petroleum resins prepared in Preparation Examples 1-4.

After adding each of a base polymer, the petroleum resins of Preparation Examples 1-4, and a catalyst to a mixer, a reactive adhesive composition was prepared by stirring the mixture. Si-APAO (Vestoplast 206, Evonik) and Si-PP (Licocene PP SI 1362, Clariant) were used as the base polymer, and Hordaphos (Clariant), a phosphorous-based catalyst, was used as the catalyst.

TABLE 3

| | Base polymer | | Petroleum resin | | | | |
|---|---|---|---|---|---|---|---|
| | Si-APAO | Si-PP | Prep. Ex. 1 | Prep. Ex. 2 | Prep. Ex. 3 | Prep. Ex. 4 | Catalyst |
| Ex. 1 | 50 g | 30 g | 20 g | — | — | — | 0.5 g |
| Ex. 2 | 50 g | 30 g | — | 20 g | — | — | 0.5 g |
| Ex. 3 | 50 g | 30 g | — | — | 20 g | — | 0.5 g |
| Comp. Ex. 1 | 50 g | 30 g | — | — | — | — | 0.5 g |
| Comp. Ex. 2 | 50 g | 30 g | — | — | — | 20 g | 0.5 g |

Test Example 2: Evaluation of Physical Properties of Reactive Adhesive Composition After coating each of the reactive adhesive compositions prepared in the examples and the comparative examples on a substrate (ABS), the physical properties described below were measured, and the result is shown in Table 4.

[Lap Shear Adhesive Strength (LSS), Kgf]

In order to evaluate single-lap shear adhesion strength, the quantified reactive adhesive composition was coated (coating area: 1 inch×1 inch) between two cut ABS specimens (1 inch×6 inches).

Then, curing was performed for 2 weeks at room temperature (25° C.) under humidity (60-70%), and maximum stress (strength) was measured using an Instron tester. A total of 5 tests were performed and the average value was taken.

TABLE 4

| | Lap shear adhesive strength (%, relative value) | |
|---|---|---|
| | Before curing | After curing |
| Ex. 1 | 196 | 245 |
| Ex. 2 | 245 | 270 |
| Ex. 3 | 240 | 273 |
| Comp. Ex. 1 | 100 | 127 |
| Comp. Ex. 2 | 82 | 102 |

As seen from Table 4, when the styrene-based comonomer was used according to the present disclosure, the increase in LSS (lap shear strength) was up to about 2.45 times and about 2.98 times after the curing as compared to Comparative Example 1 and Comparative Example 2 (FIG. 1).

When the petroleum resin was used but the composition of the styrene-based comonomer was varied as in Examples 1, 2 and 3, the LSS was increased roughly with the content of the styrene-based comonomer. However, the adhesive strength reached maximum when the content of the styrene-based comonomer was above a certain level. Accordingly, it can be seen that a too high concentration of the styrene-based monomer is not preferred because the manufacturing cost is high but the increase in LSS as compared to before curing is not so large.

And, if the content of the styrene-based comonomer is too low, the aromatic structure in the resin may be not enough to achieve sufficient adhesive strength to the ABS substrate. Therefore, it can be seen that an appropriate content of the styrene-based comonomer is important to achieve the most effective physical properties.

In addition, it was confirmed that the styrene-based monomer increases wettability to the substrate, which increases the initial adhesive strength (Green strength), and that the silane content plays a major role in determining the final strength after curing through the moisture curing mechanism.

The initial adhesive strength is one of the very important physical properties in the industrial field. If the initial adhesive strength is not enough, peeling may occur after coating of the adhesive, which can deteriorate workability and productivity and cause quality problems.

INDUSTRIAL APPLICABILITY

A curable petroleum resin according to the present disclosure may be preferably used as a composition added to a reactive adhesive composition.

The invention claimed is:

1. A curable petroleum resin comprising a repeating unit derived from a petroleum resin monomer (A), a repeating unit derived from a silane monomer (B) and a repeating unit derived from a styrene-based monomer (C),
wherein the curable petroleum resin comprises 30-70 wt % of the repeating unit derived from a petroleum resin monomer (A), 10-40 wt % of the repeating unit derived from a silane monomer (B) and 25-40 wt % of the repeating unit derived from a styrene-based monomer (C) based on 100 wt % of the total repeating units.

2. The curable petroleum resin according to claim 1, wherein the styrene-based monomer is one or more selected from a group consisting of styrene, α-methylstyrene, 3-methylstyrene, 4-methylstyrene, 2,4-dimethylstyrene, 2,5-dimethylstyrene, 2-methyl-4-chlorostyrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluoro styrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, 4-hydroxystyrene and a mixture thereof.

3. The curable petroleum resin according to claim 1, wherein the petroleum resin monomer is one selected from a group consisting of a mixed C5 fraction, a mixed C9 fraction and dicyclopentadiene obtained from naphtha cracking.

4. The curable petroleum resin according to claim 1, wherein the silane monomer is represented by Chemical Formula 2:

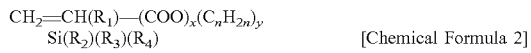   [Chemical Formula 2]

wherin $R_1$ is hydrogen or a methyl group, each of $R_2$ through $R_4$, which are identical to or different from each other, is hydrogen, a $C_1$-$C_{20}$ alkyl group, a $C_3$-$C_{12}$ cycloalkyl group, a $C_1$-$C_{12}$ alkoxy group, a $C_2$-$C_{12}$ acyloxy group, a $C_6$-$C_{30}$ aryloxy group, a $C_5$-$C_{30}$ araloxy group or a $C_1$-$C_{20}$ amine group, n is an integer from 1 to 12, and each of x and y is 0 or 1.

5. The curable petroleum resin according to claim 4, wherein $R_1$ is hydrogen or a methyl group, each of $R_2$ through $R_4$, which are identical to or different from each other, is a $C_1$-$C_6$ alkyl group or a $C_1$-$C_6$ alkoxy group, n is an integer from 1 to 6, each of x and y is 0 or 1.

6. The curable petroleum resin according to claim 4, wherein the silane monomer is one selected from a group consisting of vinyltrimethylsilane, vinyltrimethoxysilane, vinyltriethoxysilane, triacetoxyvinylsilane, triphenylvinylsilane, tris(2-methoxyethoxy)vinylsilane, 3-(trimethoxysilyl)propyl methacrylate and γ-(meth)acryloxypropyltrimethoxysilane.

7. The curable petroleum resin according to claim 1, wherein the curable petroleum resin has a softening point of 70-150° C. and a weight-average molecular weight ($M_w$) of 500-5000 g/mol.

8. A reactive adhesive composition comprising a polyolefin-based base polymer, a petroleum resin and a catalyst, wherein the petroleum resin is the curable petroleum resin according to claim 1.

9. The reactive adhesive composition according to claim 8, wherein the reactive adhesive composition comprises 70-94 wt % of a polyolefin-based base polymer, 5-29.9 wt % of a petroleum resin and 0.1-10 wt % of a catalyst based on 100 wt % of the total composition.

10. The reactive adhesive composition according to claim 8, wherein the polyolefin-based base polymer is one or more selected from a group consisting of poly-α-olefin, a polyolefin homopolymer, a copolymer thereof and a blend thereof.

* * * * *